United States Patent [19]

Kanzaki

[11] Patent Number: 4,762,485

[45] Date of Patent: Aug. 9, 1988

[54] CASTING FRAME STRUCTURE OF CENTRIFUGAL CASTING MACHINE

[75] Inventor: Ichiro Kanzaki, 14-12 Shimoitohzu 4-chome, Kokurakita-ku, Kitakyushu-shi, Japan

[73] Assignees: Ichiro Kanzaki, Kitakyushu; Mitsuharu Ogura, Takamatsu, both of Japan

[21] Appl. No.: 943,119

[22] Filed: Dec. 17, 1986

[30] Foreign Application Priority Data

| | | | |
|---|---|---|---|
| Dec. 18, 1985 | [JP] | Japan | 60-286596 |
| Mar. 24, 1986 | [JP] | Japan | 61-066862 |
| Aug. 19, 1986 | [JP] | Japan | 61-195038 |

[51] Int. Cl.4 .............................................. B29C 41/04

[52] U.S. Cl. ...................................... 425/434; 425/435

[58] Field of Search ............... 425/425, 430, 434, 438, 425/440, 436 R

[56] References Cited

U.S. PATENT DOCUMENTS

| | | | |
|---|---|---|---|
| 1,073,584 | 9/1913 | Annis | 425/434 |
| 1,566,568 | 12/1925 | Williams | 425/434 |
| 1,626,447 | 4/1927 | Bramin | 425/434 |
| 2,476,395 | 7/1949 | Williams | 425/434 |
| 2,703,537 | 3/1955 | Vogt | 425/425 |

*Primary Examiner*—Willard E. Hoag

*Attorney, Agent, or Firm*—Jordan and Hamburg

[57] ABSTRACT

A casting frame structure of a centrifugal casting machine which comprises a hollow rotary drum in a concrete-slurry charging space is formed, a rear-end plate replaceably attached to the rear end of the rotary drum, a front-end plate replaceably attached to the front end of the rotary drum and having a feeder opening through which a concrete feeder is inserted into the concrete-slurry charging space of the rotary drum, a plurality of outer frames and/or a plurality of cores mounted on the inner surface of the rotary drum defining a plurality of concrete-slurry casting spaces therebetween each of which is open to the concrete-slurry charging space. In the casting frame structure at least a part of each outer frame and/or each core is movable in a direction away from an outer surface of a concrete product to be produced in the concrete-slurry casting space and a plurality of outer-frame positioning-and-fixing members and/or a plurality of core-positioning-and-fixing members are disposed between the front end of the rotary drum and the front end plate as well as between the rear end of the rotary drum and the rear end plate.

9 Claims, 21 Drawing Sheets

FIG. I

CASTING FRAME STRUCTURE OF CENTRIFUGAL CASTING MACHINE

TECHNICAL FIELD

The present invention relates to an improvement of a casting frame structure of a centrifugal casting machine.

BACKGROUND ART

Conventionally, as one of methods for producing concrete products, a centrifugal casting method is known and the machine used for the method comprises a rotary drum which is rotated at a high speed by a rotating mechanism and a multiplicity of outer frames and a multiplicity of cores which are mounted on the inner surface of the rotary drum.

For producing the concrete products, concrete slurry is charged into the rotary drum by way of a feeder chute or a screw feeder which has the front end thereof disposed within the rotary drum while the rotary drum is being rotated at a high speed. Due to the above rotation of the rotary drum, a centrifugal force is exerted on the charged cement slurry and the cement slurry fills a plurality of casting spaces defined by the outer frame and cores. After the above casting operation, the cement slurry filled in the casting space is hardened and cured for a desired period and concrete products are removed from the casting spaces.

With the above centrifugal casting machine, however, in each casting operation, the outer frames and the cores must be mounted on the inner surface of the rotary drum before the casting operation, and the outer frames and the cores must be dismounted from the inner surface of the rotary drum to remove the concrete products from the rotary drum after the casting operation. Accordingly, the casting operation is, in general, very cumbersome and time-consuming.

Furthermore, during the casting operation, the concrete slurry is filled in the casting spaces with a considerable centrifugal force so that the concrete products, after being hardened, firmly adhere to the inner surfaces of the outer frames or outer surfaces of the cores. Accordingly, during the dismounting of the outer frames or the cores to take out the concrete products from the rotary drum, the concrete products receive a biased force which causes the rupture or cracks on the concrete products.

Accordingly, it is an object of the present invention to provide a casting frame structure of a centrifugal casting machine which can resolve the above defects of conventional casting frame structures so as to enable the prompt or ready mass-production of the concrete products.

It is another object of the present invention to provide a casting frame structure of a centrifugal casting machine which can produce the concrete products of high quality and high precision which are completely free from ruptures or cracks.

DISCLOSURE OF INVENTION

In summary, the present invention discloses a casting frame structure of a centrifugal casting machine which comprises a hollow rotary drum in which a concrete-slurry charging space is formed, a rear-end plate replaceably attached to the rear end of said rotary drum, a front-end plate replaceably attached to the front end of the rotary drum and having a feeder opening through which a concrete feeder is inserted into the concrete-slurry charging space of the rotary drum, at least a plurality of outer frames and/or a plurality of cores which are mounted on the inner surface of the rotary drum defining a plurality of concrete-slurry casting spaces therebetween each of which is open to the concrete-slurry charging space. In accordance with the invention at least a part of each outer frame or each core is movable in a direction away from an outer surface of a concrete product to be produced in the concrete-slurry casting spaces and a plurality of outer-frame positioning-and fixing-members and/or a plurality of core-positioning-and-fixing members are disposed between the front end of the rotary drum and the front end plate as well as between the rear end of the rotary drum and the rear end plate.

BEST MODE FOR CARRYING OUT THE INVENTION

Figure 1:
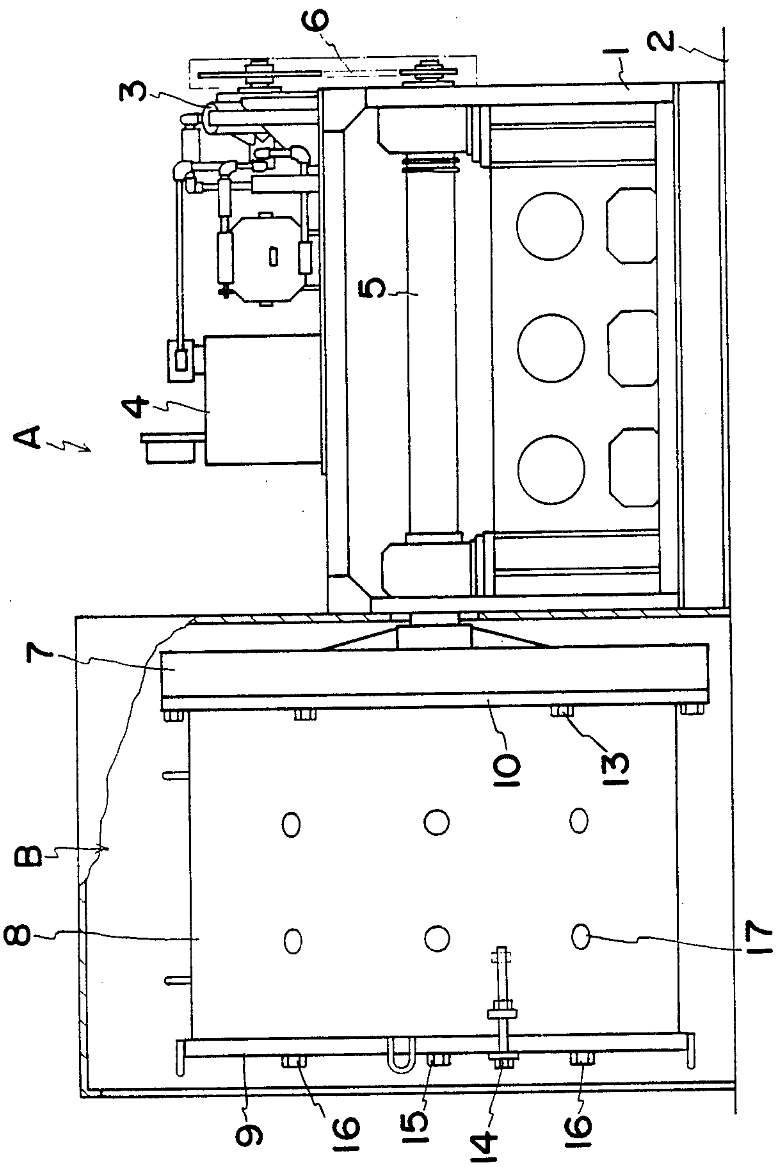
FIG. 1 is an elevational view of the centrifugal casting machine provided with the casting frame structure of the first embodiment of the invention.

The present invention is disclosed in view of following two embodiments.

FIRST EMBODIMENT

In FIG. 1 to FIG. 5, A indicates a centrifugal casting machine which is constructed as follows.

A support frame 1 is installed on a floor 2 and a hydraulic motor 3 is hydraulically connected with an oil storage tank 4 and mounted on the upper face of the support frame 1.

A main rotary shaft 5 is rotatably disposed within the support frame 1 and has one end operably connected with an output shaft of the hydraulic motor 3 by means of a power-transmitting mechanism 6 such as an endless chain and the other end thereof extended from the one side of the support frame 1.

A circular rotary plate 7 is fixedly secured to the extended end of the rotary shaft 5 by a suitable holding mechanism.

On such circular rotary plate 7, a casting frame structure B is replaceably but firmly mounted and such casting frame structure B comprises a circular cylindrical rotary drum 8, an annular front-end plate 9 replaceably mounted on the front side of the rotary drum 8, a rear-end plate 10 also replaceably mounted on the rear end of the rotary drum 8 and a multiplicity of outer frames 11 and cores 12 which are mounted on the inner surface of the rotary drum 8.

Figure 2:
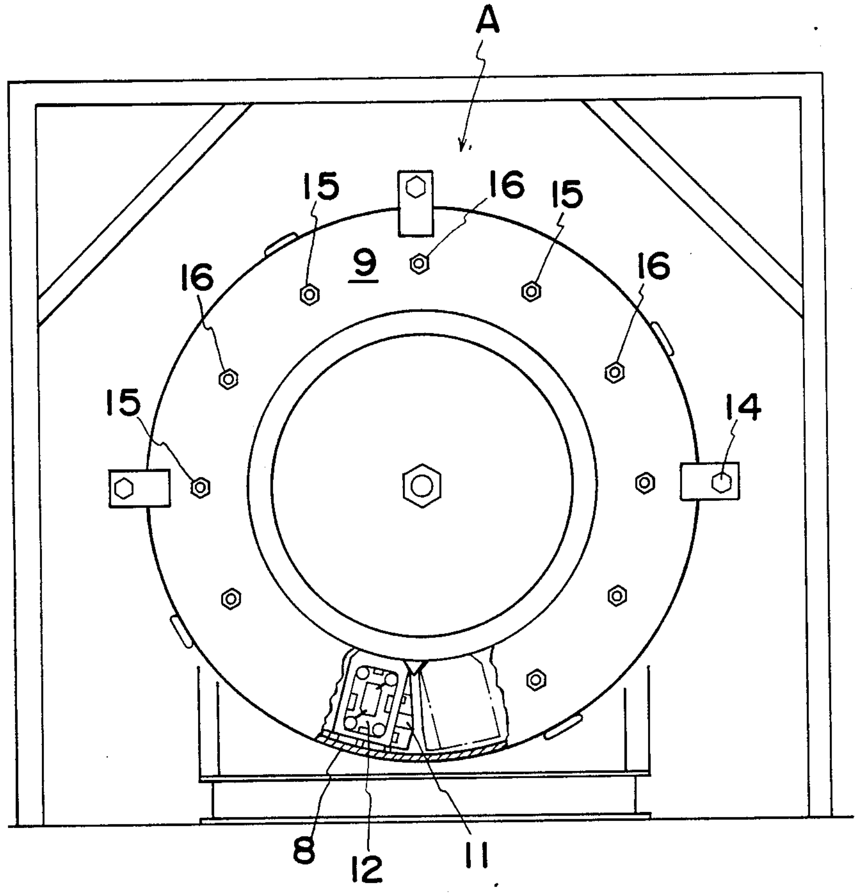
FIG. 2 is a front side view with a part broken away of the centrifugal casting machine.

In the above construction, as shown in FIG. 1 and FIG. 2, the holding mechanism comprises a plurality of fastening bolts 13 which fixedly secure the rear-end plate 10 to the circular rotary plate 7.

Around the rotary drum 8, a plurality of drum-suspending bolts 14 are provided and each bolt 14 has one end connected to the outer surface of the rotary drum 8 and the other end adjustably engaged with the front end plate 9.

Figure 4:
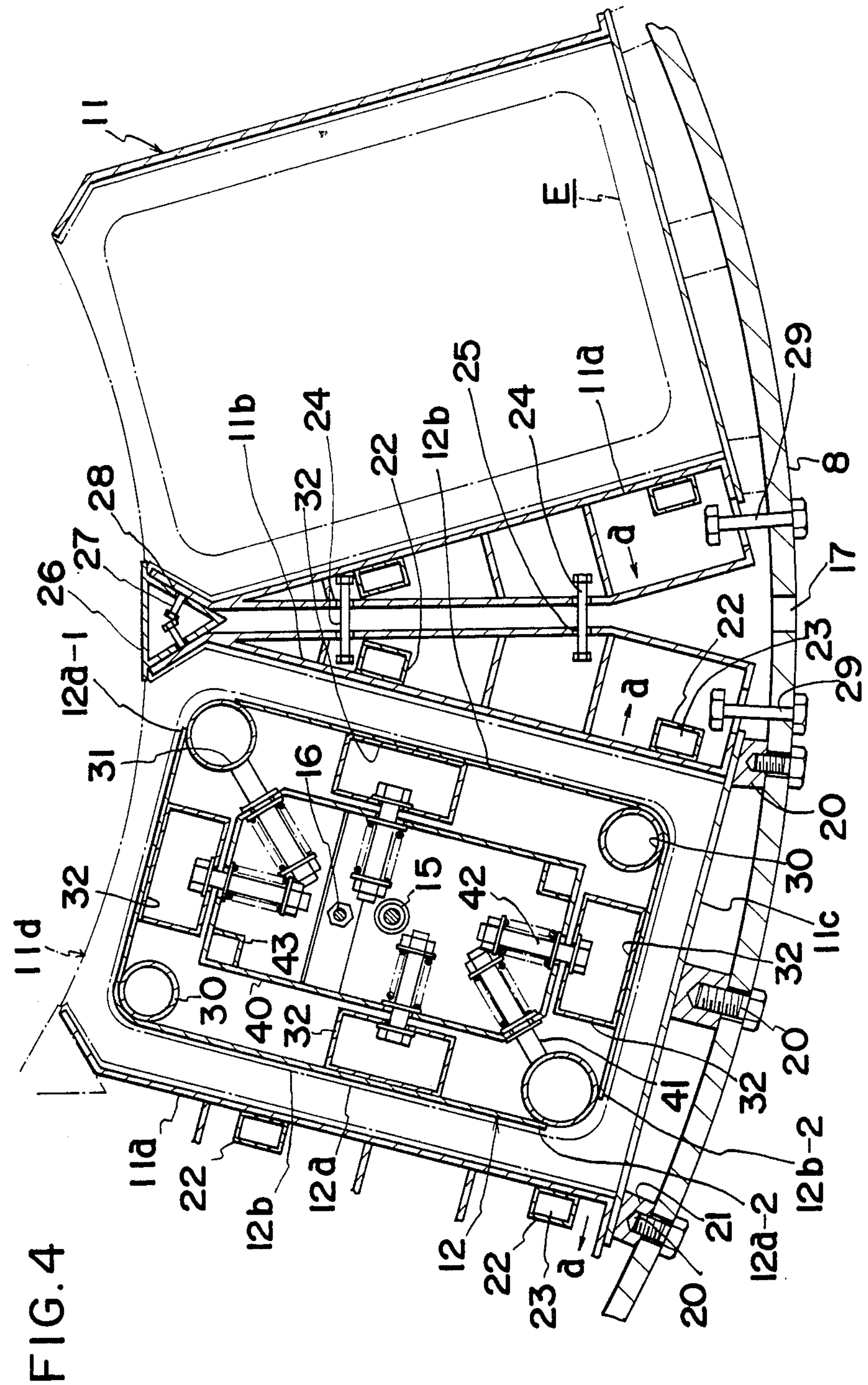
FIG. 4 is an enlarged view of the broken-away part of the casting frame structure of FIG. 2 with the outer frames and the cores in a loosened or retracted position.
Figure 5:
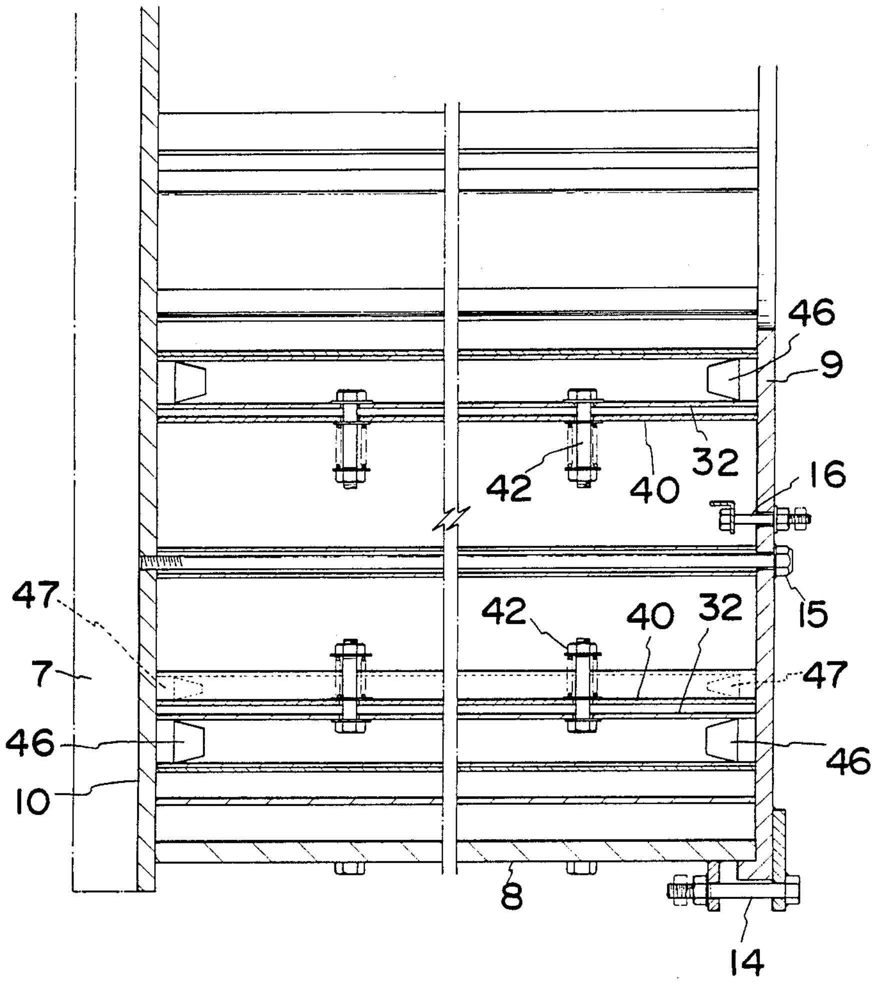
FIG. 5 is a cross-sectional view of the above casting frame structure taken along the line I—I of FIG. 3.

As shown in FIG. 1, FIG. 4 and FIG. 5, a plurality of elongated fastening bolts 15 pass through the front-end plate 9, the rotary drum 8 and the rear-end plate 10 for tightly uniting such three components to form the casting frame structure B until the removal of concrete products E which is described later.

As shown in FIG. 2, FIG. 4 and FIG. 5, the casting frame structure B is further provided with a plurality of coresuspending bolts 16 and each bolt 16 has one end thereof connected to the front-end plate 9 and the other end thereof connected to the core 12 by way of a base frame 40 which will be described later.

As can be readily understood from FIG. 1, the rotary drum 8 is provided with a plurality of apertures 17 for drainage of concrete slurry which is over-flown from a concrete casting space D defined between the outer frame 11 and the core 12.

The construction of the outer frames 11 and the cores 12 which are accomodated in the rotary drum 8 are explained in detail hereinafter in conjunction with FIG. 3 to FIG. 5.

Figure 3:
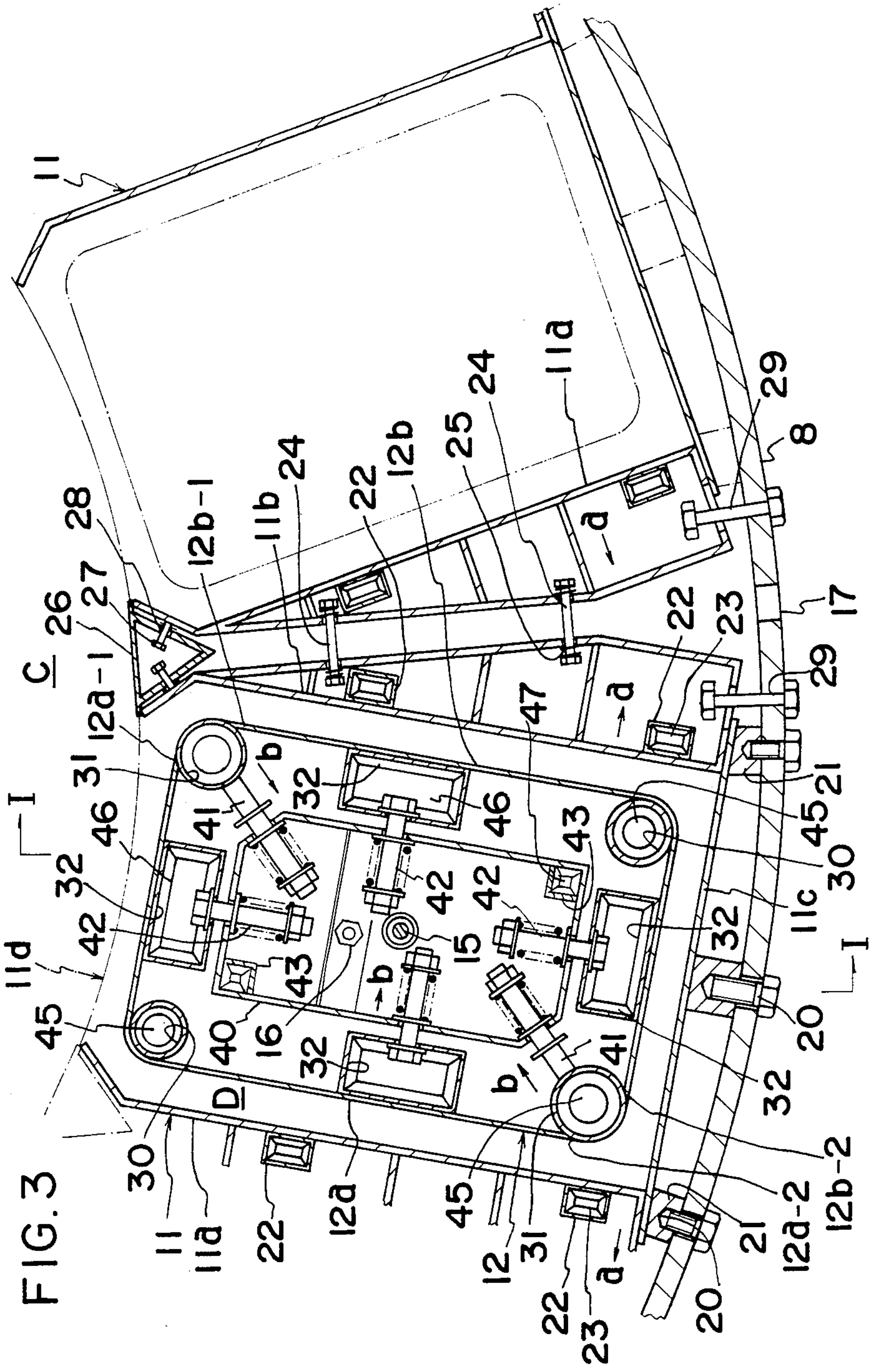
FIG. 3 is an enlarged view of the broken-away part of the casting frame structure of FIG. 2.

As shown in FIG. 3, the outer frame 11 and the core 12 are concentrically assembled along the inner surface of the rotary drum 8 and have the rectangular cross-sections respectively and the outer frames 11 and cores 12 each have a length equal to the length of the rotary drum 8.

The outer frame 11 is made of a pair of radially-extending side plates 11*a*, 11*b* and an outer end plate 11*c* thus forming a core-inserting space therein which communicates with a concrete charging space C formed in the rotary drum 8 by way of an inner opening 11*d*.

Furthermore, the outer end plate 11*c* is fixedly secured to the rotary drum 8 by means of a plurality of fastening bolts 20 and fastening blocks 21 while the pair of radially-extending side plates 11*a*, 11*b* are movably mounted on the outer plate 11*c* in a circumferential shown by the arrow a.

In the above construction, the outer plate 11*c* can be welded to the inner surface of the rotary drum 8.

Still furthermore, the side plates 11*a* and 11*b* are provided with a plurality of pin-inserting sleeves 22 so that the outer frame 11 can be positioned and fixed in place relative to the front end plate 9 and rear end plate 10 together with a plurality of frame-positioning-and-fixing pins 23 mounted on the front end plate 9 and the rear end plate 10.

Additionally, the side plates 11*a* and 11*b* of the outer frame 11 are connected to side plates 11*b* and 11*a* of the neighboring outer frame 11 by means of connecting bolts 24 which are provided with springs 25 for giving a biasing force in the direction of arrow a to the side plates 11*a* and 11*b*.

Furthermore, the inner ends of the side plates 11*a* and 11*b* are loosely connected to a triangular sleeve 26 by means of connecting bolts 27 provided with biasing springs 28, while the outer ends of the side plates 11*a* and 11*b* are loosely connected to the rotary drum 8 by means of connecting bolts 29.

The core 12 which is concentrically disposed in the outer frame 11 forms a concrete charging space D between the inner surface of the outer frame 11 and the outer surface of the core 12.

The core 12 is substantially made of a pair of separate or independent L-shaped plates 12*a* and 12*b* which are combined in the outer frame 11 to form a core body of a tubular rectangular cross-section.

At the four corners of the rectangular core 12, a plurality of pin-inserting sleeves 30 and 31 which have the same length as the rectangular core 12 are disposed, wherein two diagonally opposite sleeves 30 are fixedly secured to the inner side of the corner portion of the L-shaped plates 12*a* and 12*b* while other two diagonally opposite sleeves 31 are retractably disposed in a diagonal direction and both extremities 12*a*-1, 12*a*-2 and 12*b*-1 and 12*b*-2 of the L-shaped plates 12*a* and 12*b* separably come into contact with the outer surface of the pin-inserting sleeves 31.

Another four pin-inserting sleeves 32 are fixedly mounted on the inner surface of the flat edges of the rectangular core 12.

Inside the rectangular core 12, a core retracting mechanism is disposed and such mechanism comprises a rectangular base frame 40 and a plurality of spring-loaded retractable bars 41 and 42 which have distal ends thereof connected with pin-inserting sleeves 31 and 32 respectively and proximal ends thereof supported by the base frame 40. The base frame 40 is further provided with a pair of diagonal pin-inserting sleeves 43 at the corners thereof.

A plurality of core-positioning-and-fixing pins 45,46 and 47 which are mounted on the front end plate 9 and the rear end plate 10 are replaceably inserted into the above pin-inserting sleeves 30,31,32 and 43 for accurately positioning and firmly fixing the core 12 in place relative to the inner surface of the rotary drum 8.

Due to such construction, when the frame positioning-and-fixing pins 23 and core-positioning-and-fixing pins 45,46 and 47 are removed from the pin-inserting sleeves 22,30,31,32 and 43, as shown in FIG. 4, the side plates 11*a*,11*b* of the outer frame 11 are moved outwardly in the arrow direction a by the spring force of springs 25 to be smoothly peeled off from the outer surface of a concrete product E which will be described later while the shape of the rectangular core 12 is shrunk by the spring force of springs mounted on bars 41,42 in an inward direction b to be peeled off from the inner surface of the concrete product E.

On the other hand, when the pin-positioning-and-fixing pins 23 and core-positioning-and-fixing pins 45,46 and 47 are inserted into the pin-inserting sleeves 30,31,32 and 43 for assembling the casting frame structure B, the side plates 11*a*, 11*b* of the outer frame 11 are moved inwardly in a direction against the spring force of springs 25 and the rectangular core 12 is expanded against the spring force of springs mounted on bar 41,42 in an outward direction so as to take a position in place and form the concrete casting spaces D between outer frames 10 and 11.

Although in the above embodiment, springs are utilized to facilitate the removal of the concrete product E from the outer frame 11 and the core 12, such springs can be omitted when the concrete product E is sufficiently heavy to break the friction which exists between the concrete product E and the outer frame 11 or the core 12 after the removal of the frame-positioning-and-fixing pins 23 and the core-positioning-and-fixing pins 45,46 and 47.

Figure 6:
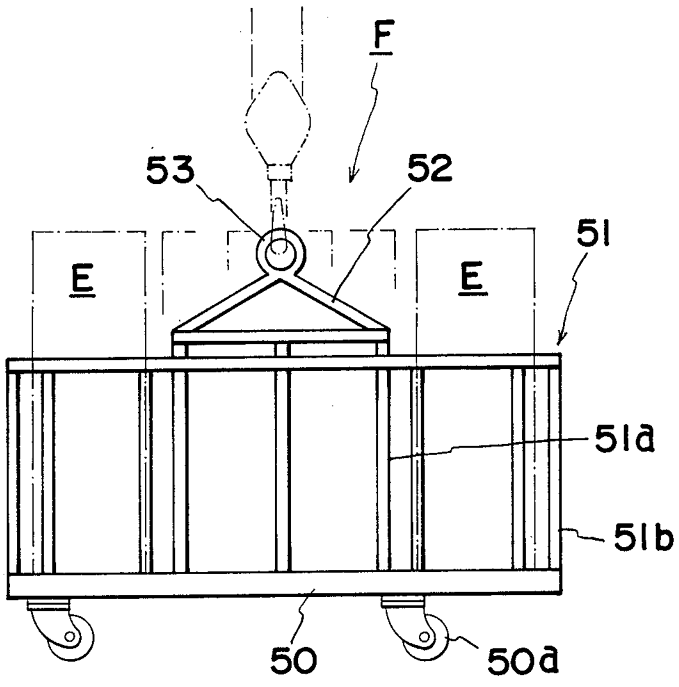
FIG. 6 is an elevational view of a movable platform provided for facilitating the removal of concrete products from the casting frame structure.
Figure 7:
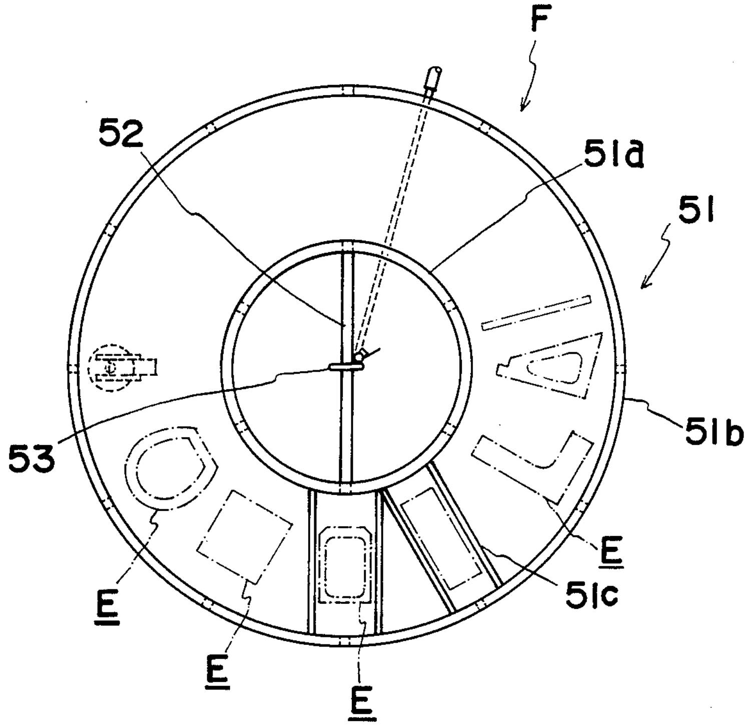
FIG. 7 is a plan view of the movable platform.

Referring now to FIG. 6 and FIG. 7, a movable platform F which is used for the removal of the concrete products E from the casting-frame structure B is shown.

The platform F substantially comprises a product-supporting circular plate 50 provided with a plurality of casters 50*a* and a product-holding frame 51 mounted on the product-supporting circular plate 50.

The product-holding frame 51 is made of an inner annular fence 51*a* and an outer annular fence 51*b* which are concentrically mounted on the circular plate 50 to define an annular space for receiving the concrete-products E from the castingframe structure B.

A suspending frame 52 which is provided with a suspending ring 53 is fixedly secured to the inner annular fence 51*a* to suspend the platform F by any suitable hoisting means such as a crane.

Figure 8:
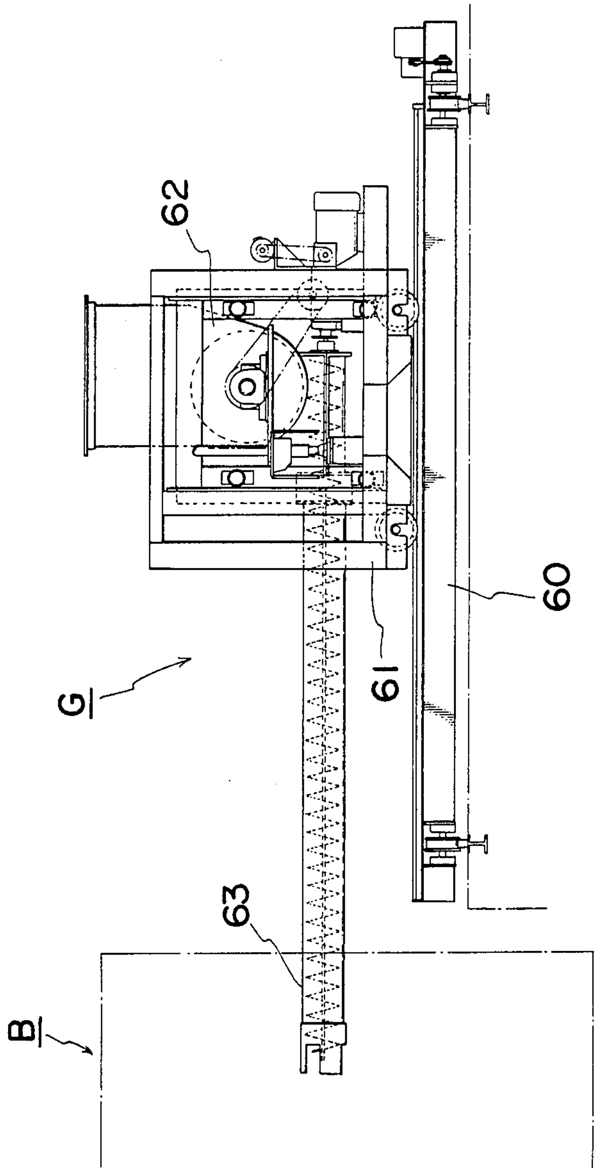
FIG. 8 is an elevational view of a concrete-slurry feeding machine provided with a screw feeder.

In FIG. 8, a concrete-slurry feeding machine G is shown and such machine comprises a lower travelling car 60 movable in a direction perpendicular to an axis of the casting frame structure B, an upper travelling car 61 movable in a direction toward the casting frame structure B, a storage tank 62 mounted on the upper travelling car 61 and a screw feeder 63 having a proximal end thereof connected with an outlet of the storage tank 62 and a distal end directed toward the casting frame structure B.

Due to such construction, the screw feeder 63 can make the distal end thereof easily and accurately inserted into the rotary drum 8 and supply the concrete slurry into the concrete-slurry charging space C in the rotary drum 8.

The manner in which the concrete products E are produced from the centrifugal casting machine A provided with the casting frame structure B of this embodiment is hereinafter disclosed in view of FIG. 9.

The casting frame structure B is driven or rotated by the hydraulic motor 3 at a high speed and the concrete slurry is charged into the concrete charging space C defined in the rotary drum 8 by way of the above-mentioned concrete feeding machine G, while the casting-frame structure B is being driven.

Due to the above rotation of the rotary drum 8, a centrifugal force is exerted on the charged concrete slurry and the concrete slurry is filled in concrete-casting spaces D defined between each outer frame 11 and the core 12.

After the above casting operation, the concrete slurry filled in the concrete-casting spaces D is hardened and cured for a desired period until the concrete products E formed in the concrete casting spaces D become sufficiently hardened to withstand the removal thereof from the concrete-casting spaces D.

Finally the concrete products E are removed from the concrete-casting spaces D in the following manners.

Figures 9A, 9B, 9C, 9D, 9E, 9F:
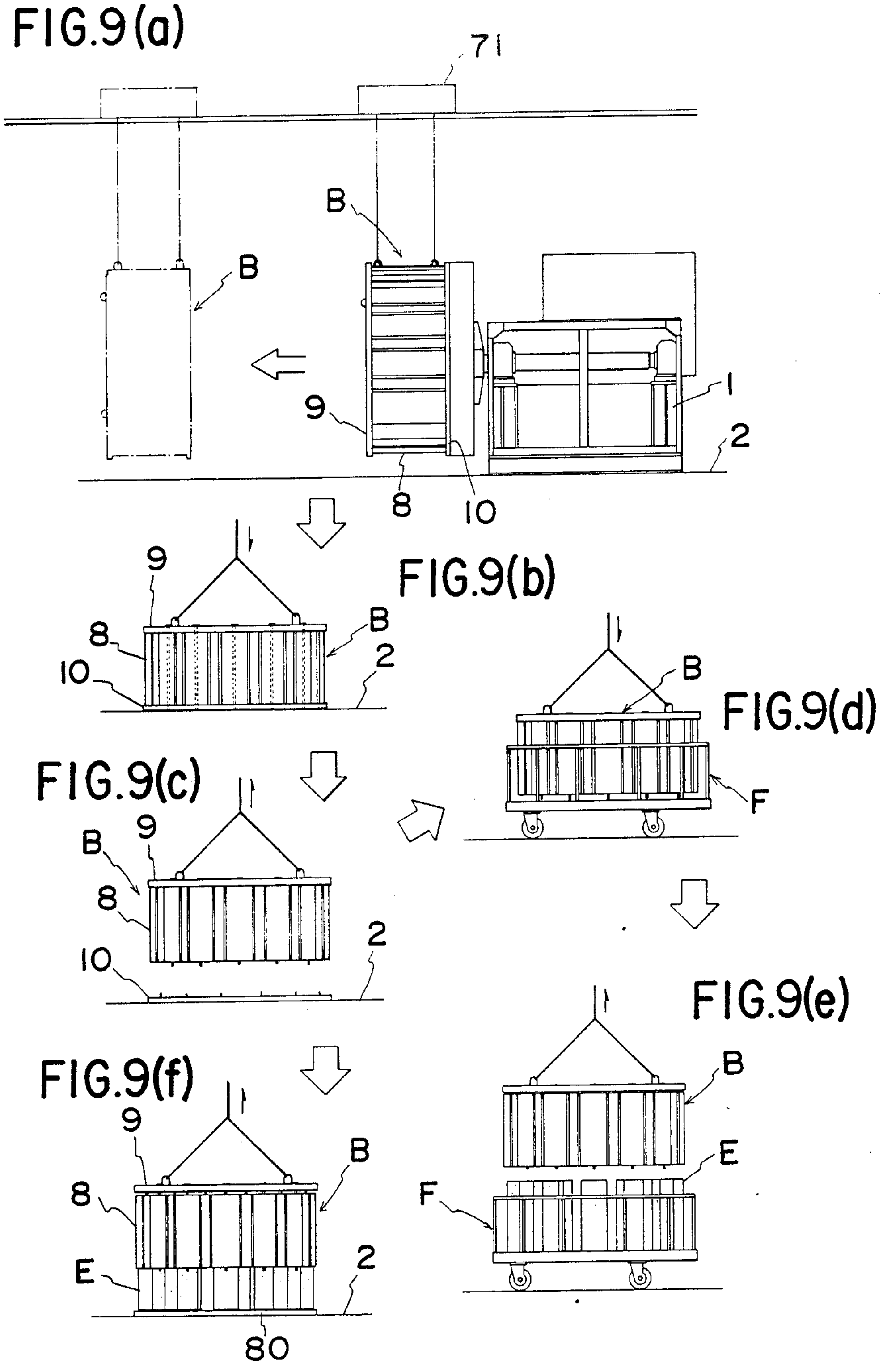
FIG. 9(*a*)–FIG. 9(*b*) are explanatory views explaining the operational steps for removing the concrete products from the casting frame structure.

As shown in FIG. 9(*a*), while suspending the casting frame structure B by a crane 71, the fastening bolts 13 are loosened to disengage the rear end plate 10 from the circular rotary plate 7 so that the casting frame structure B is removed from the circular rotary plate 7.

Then the casting frame structure B is mounted on the floor 2 as shown in FIG. 9(*b*) with the front end plate 9 directed in an upward direction.

The fastening bolts 15 are driven to disengage the bolts 15 from the rear end plate 10 and then the casting frame structure B is again suspended by the crane 71 to remove the rear end plate 10 on the floor while holding the front end plate 9, the rotary drum 8, the outer frames 11, the cores 12 and the concrete products E within the casting frame structure B as shown in FIG. 9(*c*). In general, the rear end plate 9 is automatically separated from the rotary drum 8 due to the weight thereof when the casting frame structure B is suspended.

Then the casting frame structure B is moved to and mounted on the movable platform F as shown in FIG. 9(*d*) and then the drum-suspending bolts 14 and the core-suspending bolts 16 are loosened so that the rotary drum 8 is separated from the front end plate 9 in a suspended condition due to the weight of the rotary drum 8 and the concrete products E.

Simultaneous with the above separation of the front end plate 9, the frame- and core- positioning-and-fixing pins 23, 45, 46 and 47 which are mounted on the front end plate 10 are removed from the pin-inserting sleeves 22, 31, 32 and 43 so that the outer frames 11 and cores 12 within the rotary drum 8 are disassembled and are smoothly peeled off from the inner surfaces and outer surfaces of the concrete products E.

Eventually even when the casting frame structure B is further lifted by the crane 71, the concrete products E all remain on the platform F.

In the midst of the above lifting operation, a plurality of radial members 51*c* are bridged between the inner and outer annular fences 51*a* and 51*b* as shown in FIG. 7 so as to prevent the concrete products E from turning down in a circumferential direction.

The concrete products E which stand on the movable platform F are carried to any suitable location by moving the platform by any suitable means such as casters 50*a*, the crane 71 or a forklift truck.

Referring to other operational step for removing the concrete products E from the casting frame structure B, after the operational step shown in FIG. 9(*c*), the casting frame structure B is moved to a stationary platform 80 installed on the floor 2 and the fastening bolts are loosened to separate the rotary drum 8 from the rear end plate 10 and the casting frame structure B is lifted. Accordingly, the concrete products E remain on the platform 80 in the same manner as the transportable platform F as shown in FIG. 8(*g*).

Figure 10:
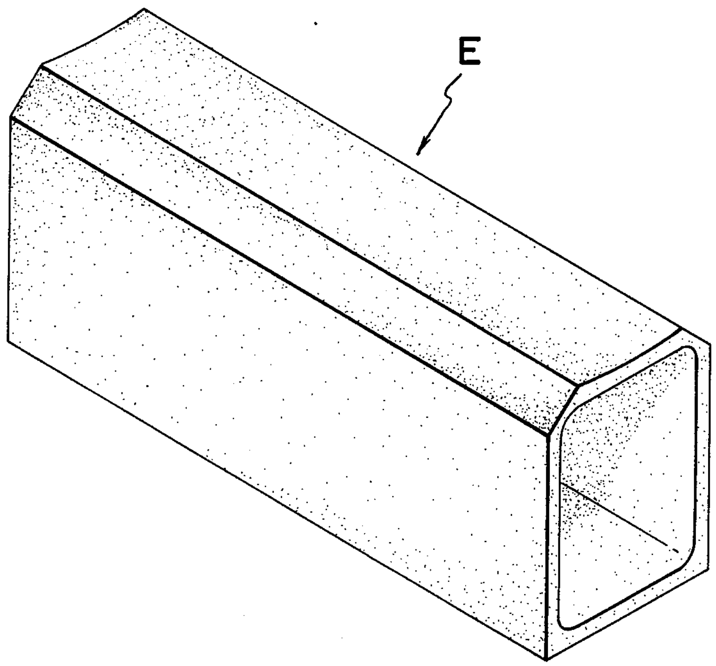
FIG. 10 is a perspective view of the concrete products removed from the casting frame structure.

In FIG. 10, the concrete product E produced by the above casting frame structure B is shown.

In the above embodiment, although the outer frames 11 and the cores 12 are constructed such that the concrete products E can have the rectangular cross section as shown in FIG. 10, the outer frames 11 and the cores 12 can be constructed in other shapes so as to produce the concrete products E of various shapes.

In FIG. 11 to FIG. 16, some modifications of the outer frames 11 and the cores 12 are shown.

Figure 11:
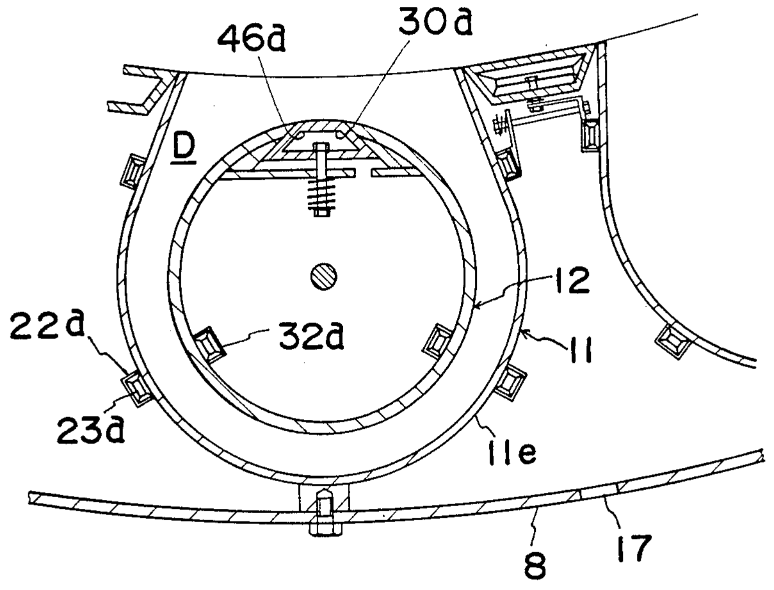
FIG. 11 to FIG. 16 are explanatory views of several modifications of the outer frames and the cores available to the casting frame structure of this embodiment.

In FIG. 11, the outer frames 11 and the cores 12 have shapes suitable for the production of the concrete products E of the circular hollow cross-section.

The outer frames 11 and the cores 12 are formed such that when frame-positioning-and-fixing pins 23*a* are removed from pin-inserting sleeves 22*a*, the outer frame 11 having an egg-shaped cross-section expands in an outward direction, while when core-positioning-and-fixing pins 46*a* are removed from pin-inserting sleeves 30*a*, the core 12 having an circular cross-section shrinks in an inward direction.

Figure 12:
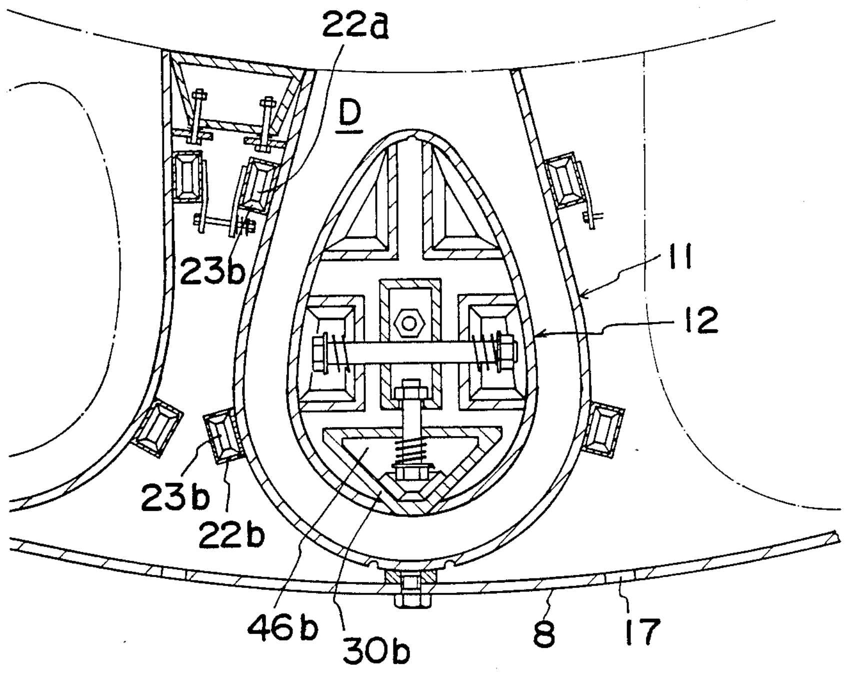

In FIG. 12, the outer frames 11 and the cores 12 have shapes suitable for the production of the concrete products E of the egg-shaped hollow cross-section.

The outer frames 11 and the cores 12 are formed such that when frame-positioning-and-fixing pins 23*b* are removed from pin-inserting sleeves 22*b*, the outer frame 11 having an egg-shaped cross-section expands in an outward direction, while when core-positioning-and-fixing pins 46*b* are removed from pin-inserting sleeves 30*b*, the core 12 having an egg-shaped cross-section shrinks in an inward direction.

Figure 13:
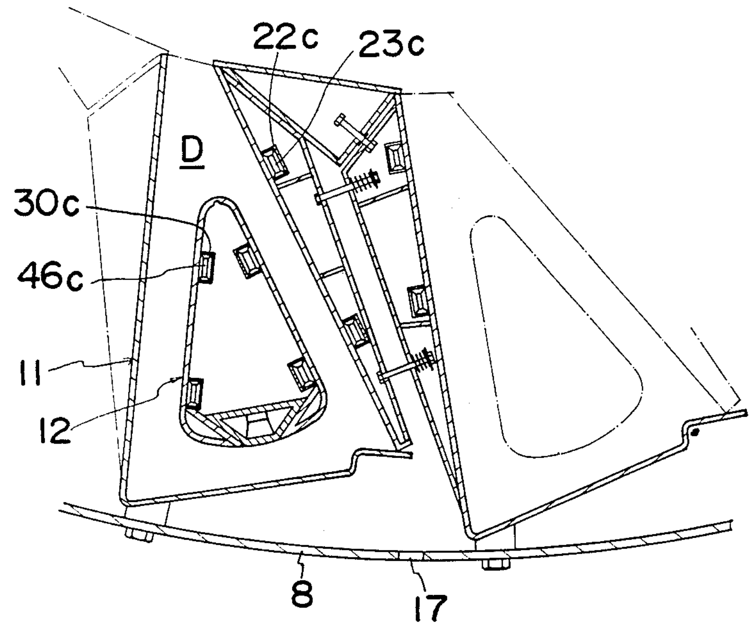

In FIG. 13, the outer frames 11 and the cores 12 have shapes suitable for the production of the concrete products E of the triangular hollow cross-section.

The outer frames 11 and the cores 12 are formed such that when frame-positioning-and-fixing pins 23*c* are removed from pin-inserting sleeves 22*c*, the outer frame 11 having a circular cross-section expands in an outward direction, while when core-positioning-and-fixing pins 46*c* are removed from pin-inserting sleeves 30*c*, the core 12 having an egg-shaped cross-section shrinks in an inward direction.

Figure 14:
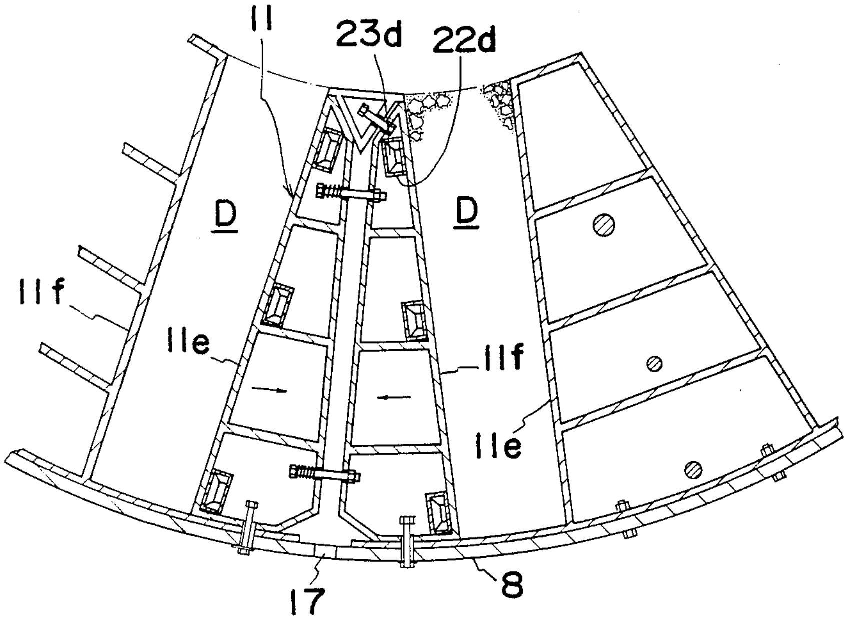

In FIG. 14, the outer frames 11 have shapes suitable for the production of the concrete products E of the solid flat rectangular cross-section.

Each outer frame 11 consists of a movable frame 11*e* and a stationary frame 11*f* and the movable frame 11*e* is formed such that when frame-positioning-and-fixing pins 23*d* are removed from pin-inserting sleeves 22*d*, the movable frame 11*e* expands in an outward direction.

Figure 15:
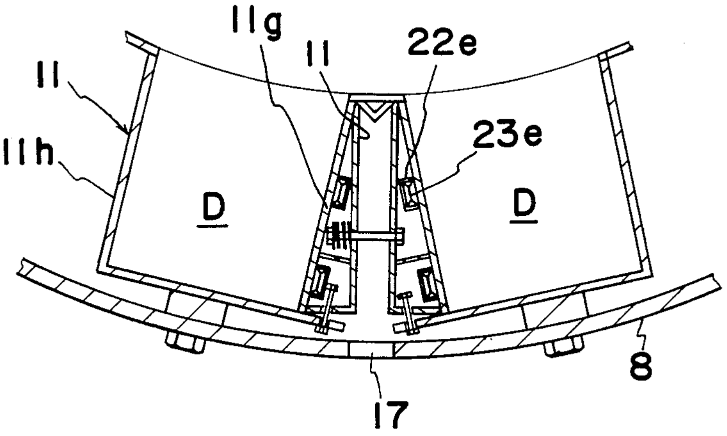

In FIG. 15, the outer frames 11 and the cores 12 have shapes suitable for the production of the concrete products E of the solid square cross-section.

Each outer frame 11 consists of a movable frame 11*g* and a stationary L-shaped frame 11*h* and the movable frame 11*g* is formed such that when frame-positioning-and-fixing pins 23*e* are removed from pin-inserting sleeves 22*e*, the movable frame 11*g* expands in an outward direction.

Figure 16:
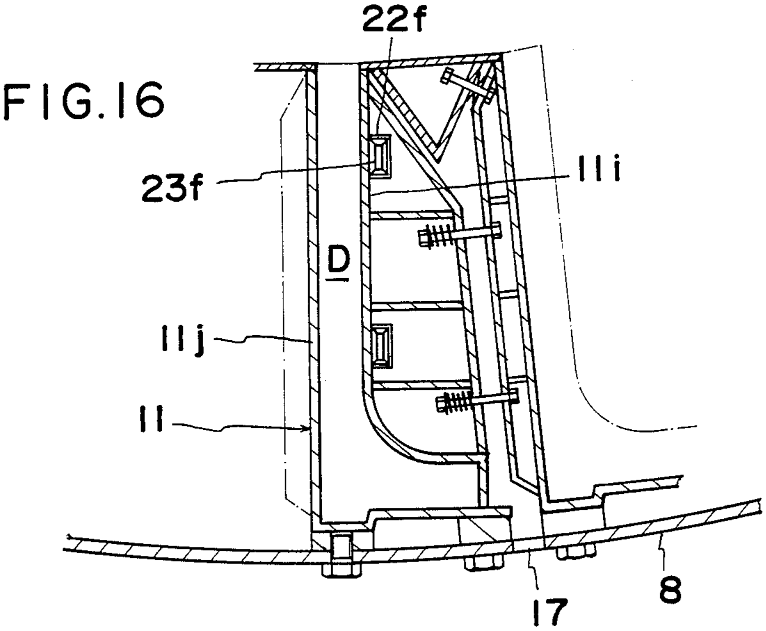

In FIG. 16, the outer frames 11 and the cores 12 have shapes suitable for the production of the concrete products E of the solid L-shaped cross-section.

Each outer frame 11 consists of a movable frame 11*i* and a stationary L-shaped frame 11*j* and the movable frame 11*i* is formed such that when frame-positioning-and-fixing pins 23*f* are removed from pin-inserting sleeves 22*f*, the movable frame 11*i* expands in an outward direction.

Figure 17:
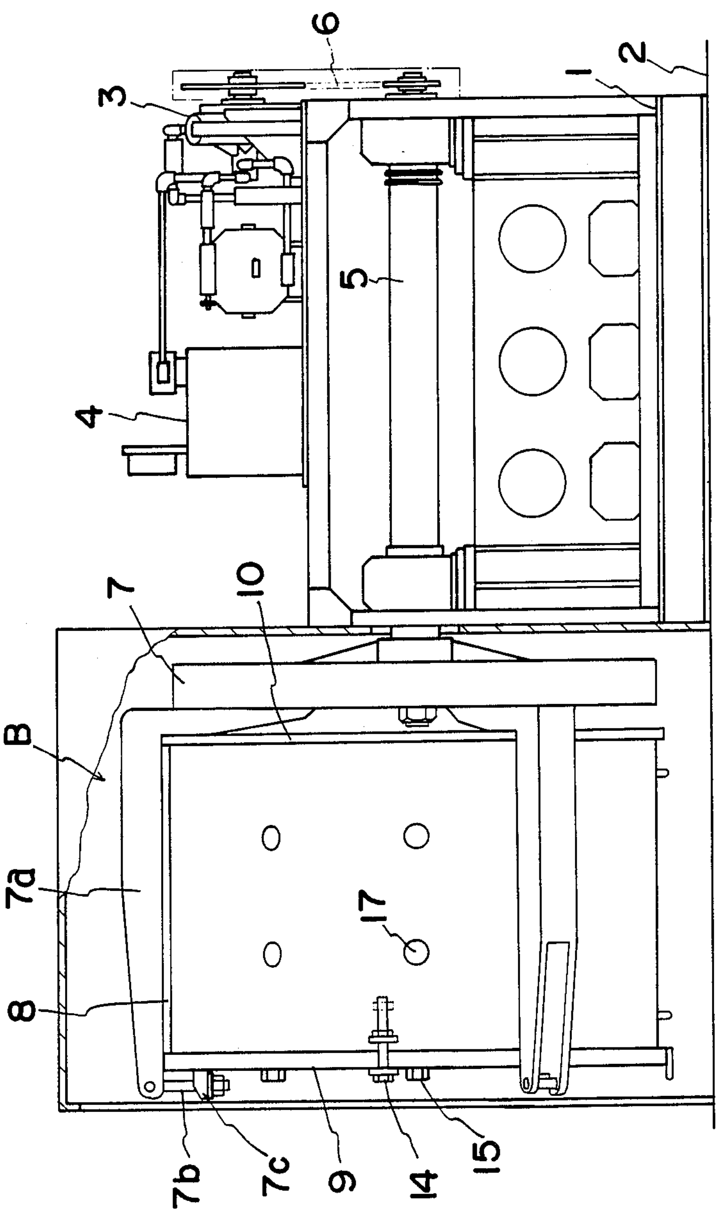
FIG. 17 is an elevational view of a centrifugal casting machine which can hold the casting frame structure of this embodiment with a holding mechanism different from the mechanism shown in FIG. 1.

In FIG. 17, a modification of the holding mechanism for holding the casting frame structure B to the circular rotary plate 7 is shown and such holding mechanism comprises a plurality of drum holding arms 7*a* which protrude from the periphery of the circular rotary plate 7 in an axial direction and a plurality of swing bolts 7*b* which detachably engage with a plurality of brackets 7*c*.

Figure 18:
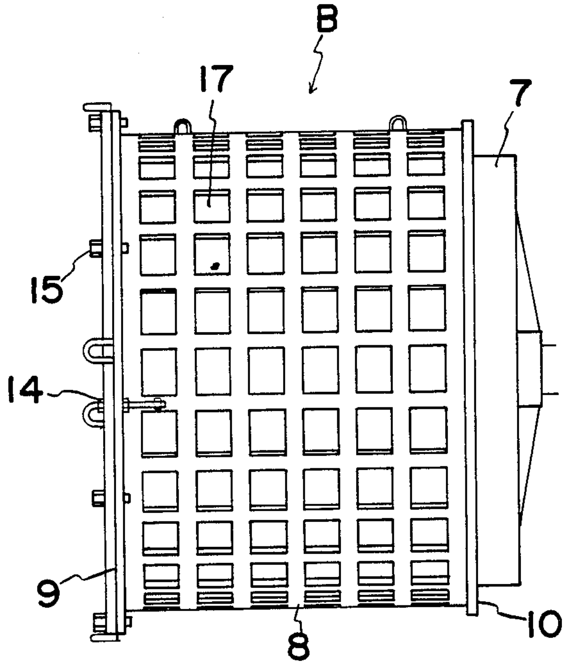
FIG. 18 is an elevational view of the modification of the casting frame structure of this embodiment.

In FIG. 18, a modifications of the first embodiment are shown, wherein the rotary drum 8 of the casting frame structure B has a multiplicity of square shaped apertures 17 for the drainage of overflown concrete slurry.

In the above embodiment, the concrete slurry may be an ordinary slurry which is a mixture of portland cement, gravel, sand and water. The concrete slurry can be in other forms such as the one which includes reinforcing materials such as synthetic resin fibers such as polyvinylidene chloride fibers, carbon fibers, glass fibers, steel bars or ornamented gravels for producing artificial plates. The concrete slurry may include coloring agent to produce colored boards or plates.

Furthermore, the concrete products E may include a lightweight material such as a foamed urethane to produce the concrete products of an improved acoustic insulation and an improved heat insulation.

The outer frames 11 and the cores 12 may be provided with designed patterns on the inner and outer surfaces thereof respectively so that the concrete products E produced with such outer frames 11 and the cores 12 can have the designed patterns on the surface thereof.

Still furthermore, the outer frames 11 and the cores 12 may be provided with peelable rubber coating films and such films are removed together with concrete products E. Furthermore outer-frame positioning-and-fixing members and core positioning-and-fixing member may be mounted on the outer frames 11, while the pin-inserting sleeves may be mounted on the front end plate and the rear end plate. Still furthermore, pin-inserting sleeves may be replaced by forming the apertures or openings on the rotary drums or the outer frames and the cores.

SECOND EMBODIMENT

In FIG. 19 to FIG. 22, the casting frame structure B of the second embodiment is shown and this embodiment is characterized in that the cores 112 are movable while the outer frames 111 are fixedly secured to the rotary drum 108 by a suitable means such as bolts or welding.

This embodiment is also characterized in that the casing frame structure B is rotatably supported on a roller base H installed on the floor 102.

The roller base H is especially effective for rotating the large-sized and heavy casting frame structure B.

Figure 19:
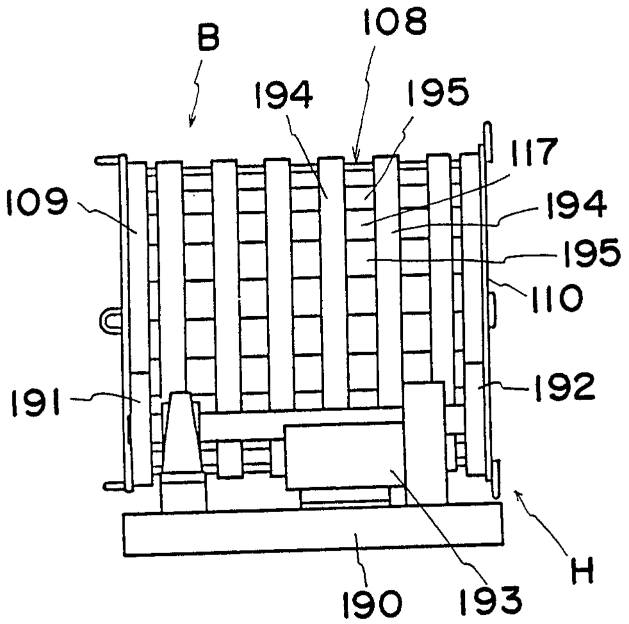
FIG. 19 is an elevational view of the centrifugal casting machine provided with the casting frame structure of the second embodiment.
Figure 20:
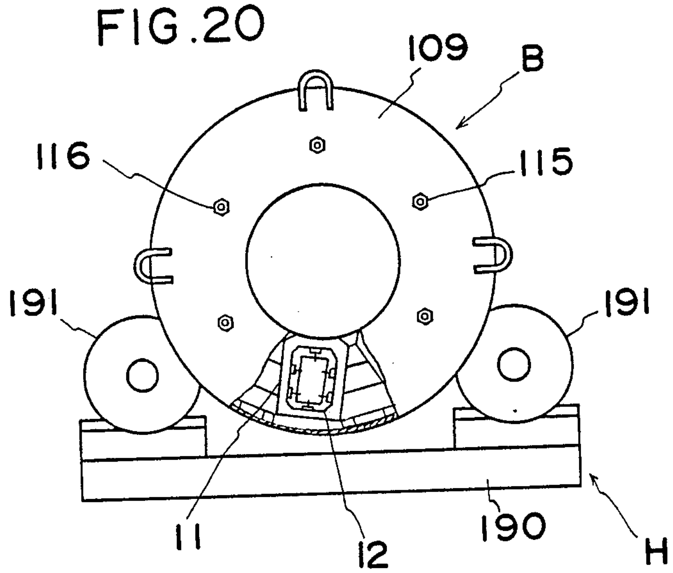
FIG. 20 is a front side view of the centrifugal casting machine.

In FIG. 19 and FIG. 20, numeral 190 indicates a stationary base on which two pairs of support rollers 191,192 are mounted and one of the rollers 192 is operably connected with a power-operated motor 193 which is also mounted on the stationary base 70.

In FIG. 19 and FIG. 20, the rotary drum 108 is formed by arranging a plurality of axial flat plates 195 and a plurality of circumferential flat plates 194 and welding them together thus forming a multiplicity of apertures 117 for the drainage of the concrete slurry.

However, since the construction of the casting frame structure B is substantially the same with the exception of above two constructions which feature this embodiment, like parts which appear in the first embodiment are denoted with numerals added with 100.

Figure 21:
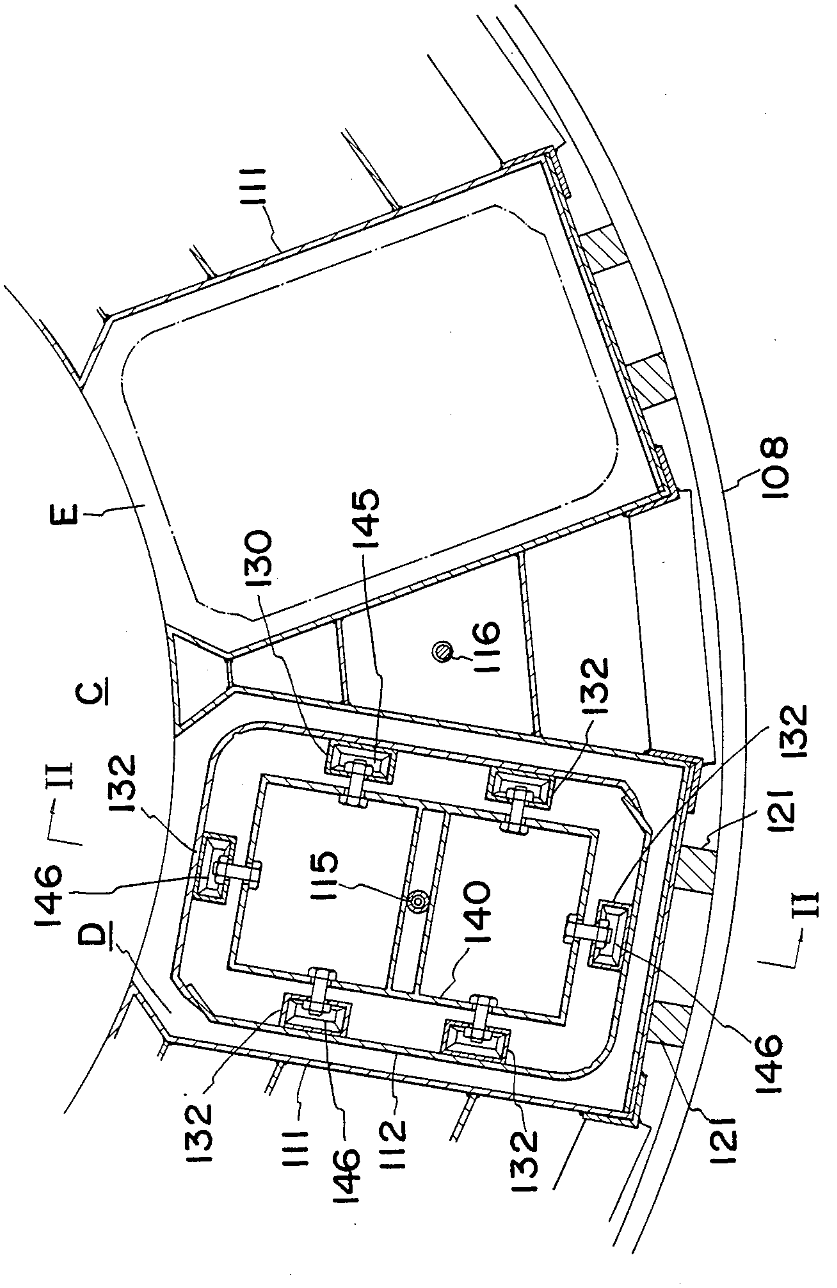
FIG. 21 is an enlarged view of the broken-away part of the casting frame structure of FIG. 20.
Figure 22:
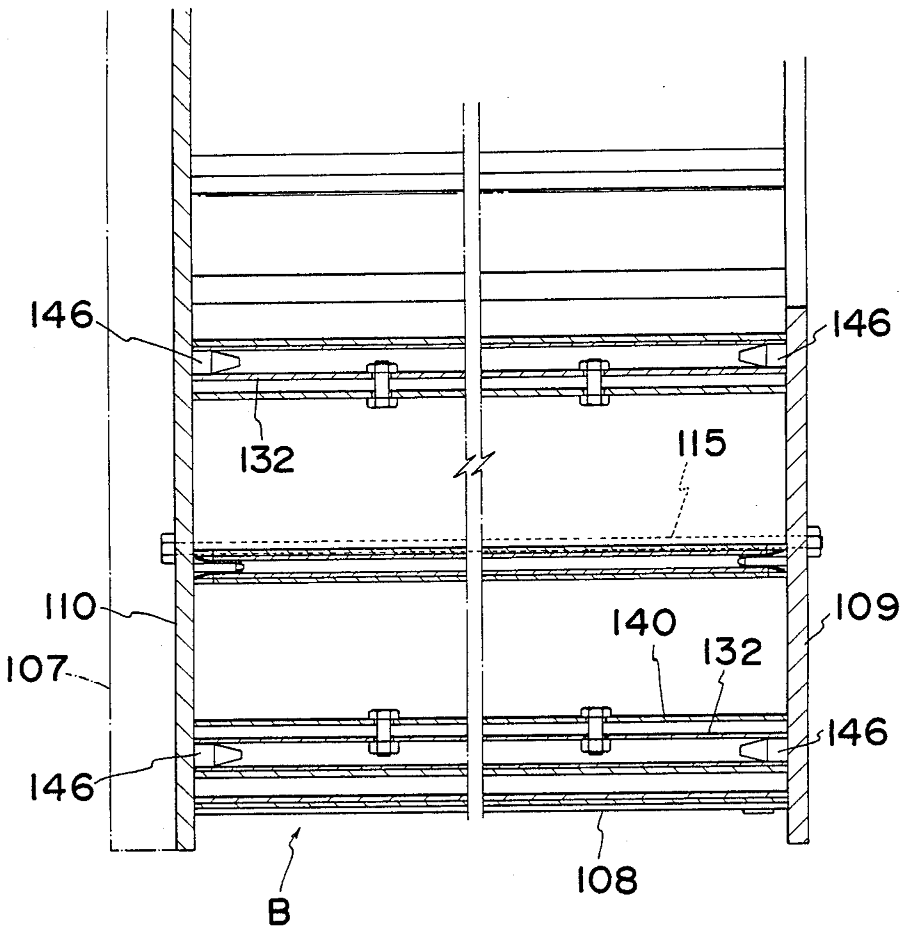
FIG. 22 is a cross-sectional view of the above casting frame structure taken along the line II—II of FIG. 21.

As apparent from FIG. 21 and FIG. 22, the front-end plate 109 and the rear-end plate 110 are provided with only a plurality of core-positioning and fixing pins 145 and a plurality of pin-inserting sleeves into which frame- and core-positioning pins 130 are inserted. The outer frame 111 is fixedly secured to the inner surface of the rotary drum 108.

Due to such construction, when the rear end plate 110 is removed and the front end plate 111 is loosened in the manner as described in the first embodiment, only outer frames 111 are shrunk and the outer frames 111 are removed from the concrete products E by dismounting the outer frames 111 into several separable parts.

In the above embodiment, although the outer frames 111 and the cores 112 are formed such that the concrete products E having the rectangular cross section as shown in FIG. 20, the outer frames 111 and the cores 112 can be formed in other shapes so as to produce the concrete products E of various shapes.

In FIG. 23 to FIG. 27, some modifications of the outer frames 111 and the cores 112 are shown.

Figure 23:
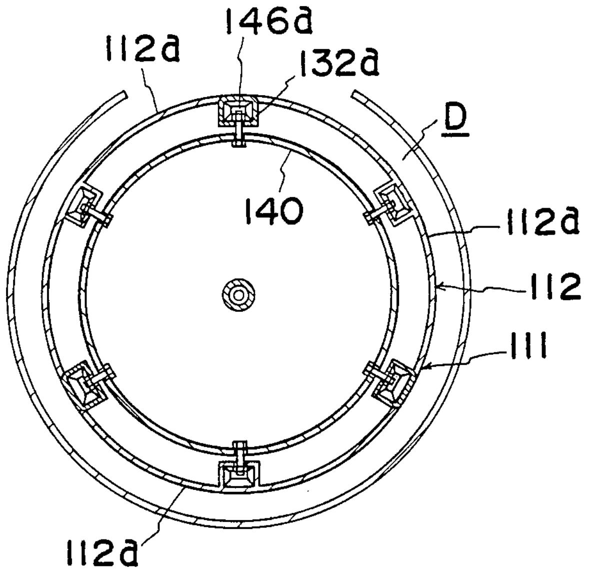
FIG. 23 to FIG. 27 are explanatory views of several modifications of the outer frames and cores applicable to the casting frame structure of this embodiment.

In FIG. 23, the outer frames 111 and the cores 112 have shapes suitable for the production of the concrete products E of circular hollow cross-section.

The outer frames 111 and the cores 112 are formed such that the outer frame 111 is made of a tube of a circular cross section and the core 112 is made of a three separable arc-shaped segments **112*a* and a pin-inserting sleeve 130*a* is disposed between segments 112*a*, 112*a* such that the radial movement of the sleeve 130*a* causes the expansion or retraction of the core 112. Into such sleeves 130*a*, a plurality of core-positioning-and-fixing pins 146*a* which are reciprocably mounted on a base frame 140*a* are inserted to cause the above movement of the core 112**.

Figure 24:
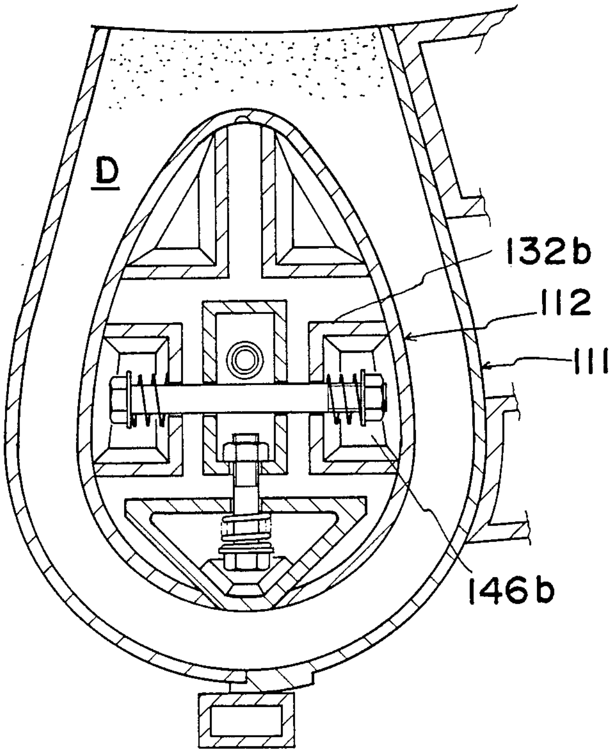

In FIG. 24, the outer frames 111 and the cores 112 have shapes suitable for the production of the concrete products E of egg-shaped hollow cross-section.

The outer frames 111 and the cores 112 are formed such that when core-positioning-and-fixing pins **146*b* are removed from pin-inserting sleeves 130*b*, the core 112** having an egg-shaped cross-section shrinks in an inward direction.

Figure 25:
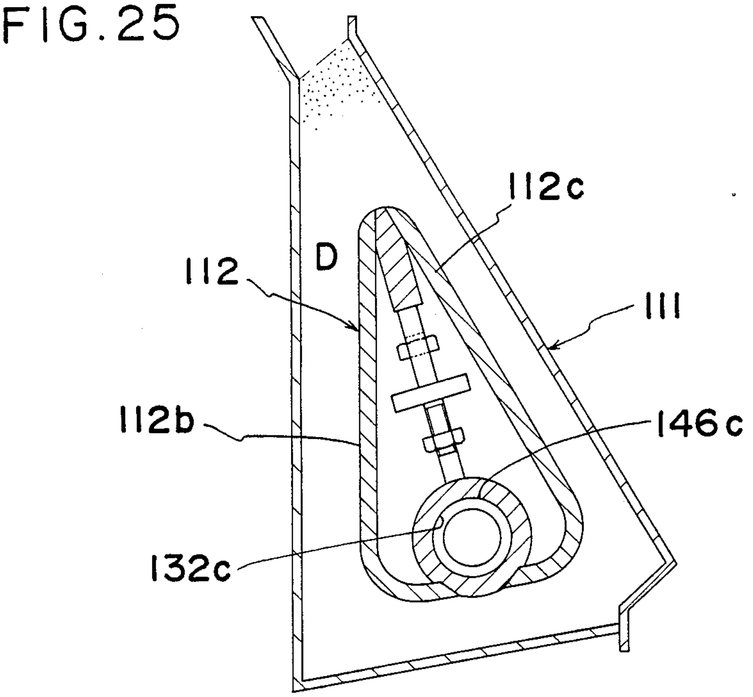

In FIG. 25, the outer frames 111 and the cores 112 have shapes suitable for the production of the concrete products E of triangular hollow cross-section.

The outer frames 111 and the cores 112 are formed such that when core-positioning-and-fixing pins **146*c* are removed from pin-inserting sleeves 130*c*, the core 112 which is made of a pair of movable L-shaped plates 112*b*, 112*c*** and has an egg-shaped cross-section shrinks in an inward direction.

Figure 26:
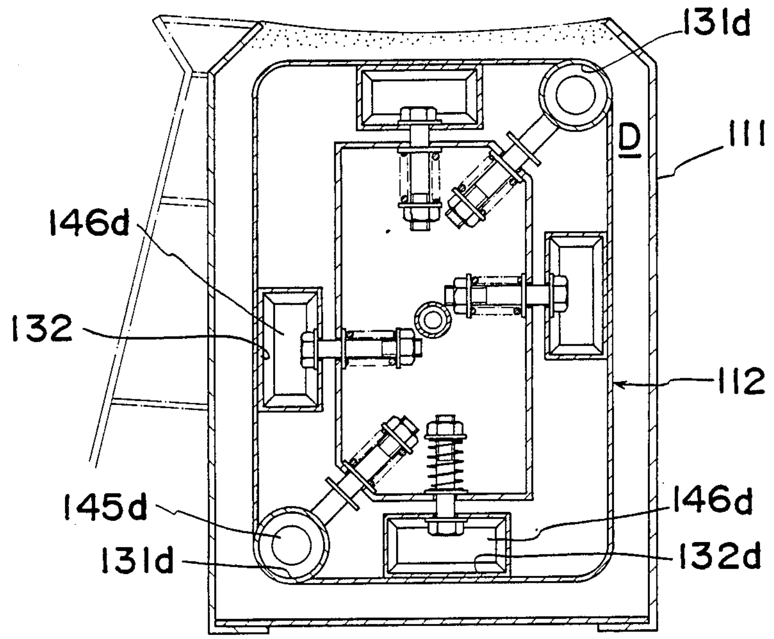

In FIG. 26, the outer frames 111 and the cores 112 have shapes suitable for the production of the concrete products E of the solid flat rectangular cross-section.

The core 112 substantially has the same construction as the construction of the first embodiment (FIG. 3) and a plurality of pin-inserting sleeves **131*d*, 132*d* and a plurality of core-positioning-and-fixing pins 145*d*, 146*d* work in the same manner provided that the outer frame 111 is made of a stationary plate fixedly secured to the rotary drum 108**.

Figure 27:
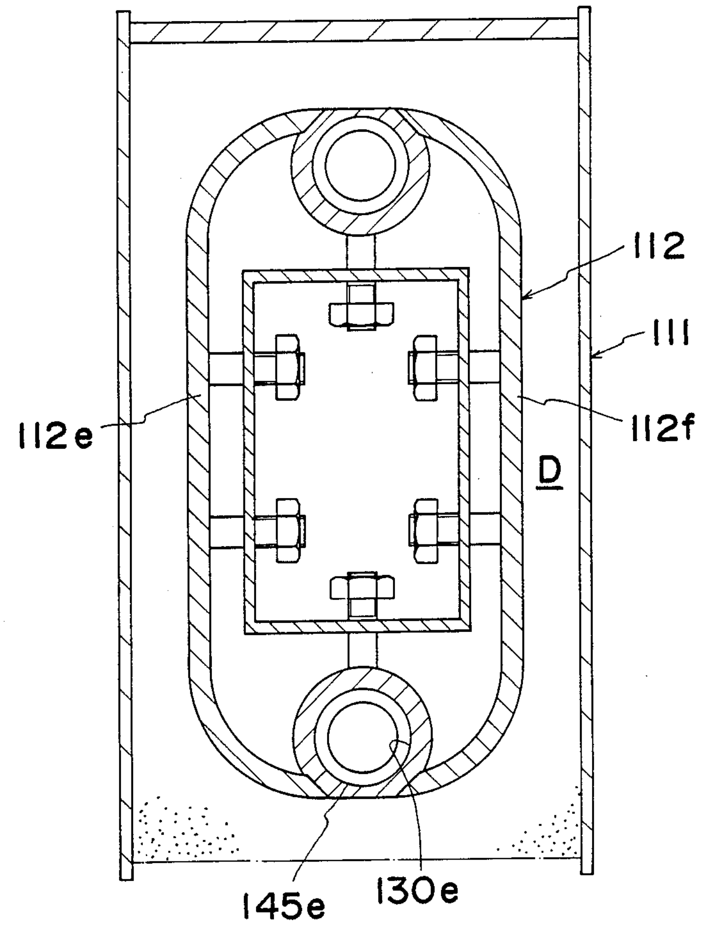

In FIG. 27, the outer frames 111 and the cores 112 have shapes suitable for the production of the concrete products E of the solid flat rectangular cross-section.

The core 112 substantially is made of symmetric parallely-spaced-apart plates **112*e*and 112*f* each of which has both ends thereof curved inwardly to separably come into contact with a pair of pin-inserting sleeves 130*e***.

Due to such construction, when the core-positioning-and-fixing pins **145*e* are inserted, the sleeves 130*e* are retracted and the plates 112*e*and 112*f*** are shrunk inwardly.

Figure 28:
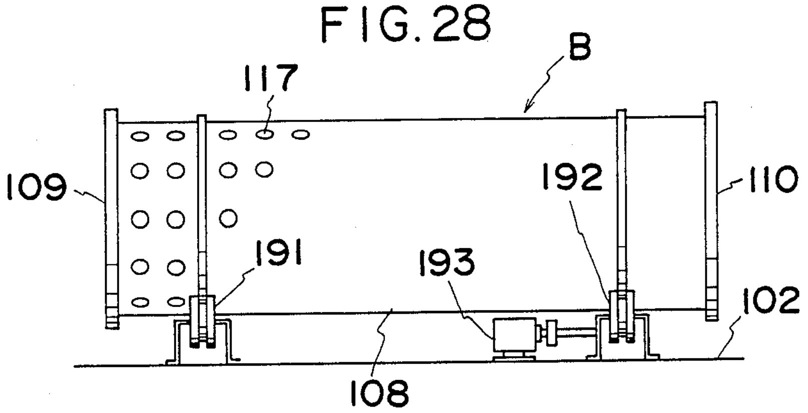
FIG. 28 are elevational views of the modifications of the casting frame structure of this embodiment.

In FIG. 28, a modification of the second embodiment is shown, wherein the casting frame structure B has the elongated rotary drum 108 so that the supporting rollers 191 and 192 are disposed in a considerably-spaced-apart manner.

I claim:

1. In a casting frame structure of a centrifugal casting machine which comprises a hollow rotary drum in which a concrete-slurry charging space is formed, a rear-end plate replaceably attached to the rear end of said rotary drum, a front-end plate replaceably attached to the front end of said rotary drum and having a feeder opening through which a concrete slurry is supplied into said concrete-slurry charging space of said rotary drum, a plurality of casting space defining members mounted on the inner surface of said rotary drum defining a plurality of concrete-slurry casting spaces therebetween, each of which is open to said concrete-slurry charging space, the improvement wherein at least some of casting space defining members are movable in a direction to enlarge said concrete-slurry casting space defined thereby, and a plurality of casting space defining member positioning-and fixing members are disposed between said front end of said rotary drum and said front end plate as well as between said rear end of said rotary drum and said rear end plate.

2. A casting frame structure of a centrifugal casting machine according to claim 1, wherein said plurality of positioning-and-fixing members of is comprised a plurality of outer-frame-positioning-and-fixing pins mounted on said front end plate and said rear end plate and a plurality of pin-inserting sleeves formed on said front and said rear end of said rotary drum.

3. A casting frame structure of a centrifugal casting machine according to claim 1, wherein said plurality of positioning-and-fixing members of is comprised a plurality of outer-frame-positioning-and-fixing pins formed on said front end and said rear end of said rotary drum and a plurality of pin-inserting sleeves mounted on said front end plate and said rear end plate.

4. A casting frame structure of a centrifugal casting machine according to claim 1, wherein said plurality of positioning-and-fixing members consists is comprised of a plurality of core-positioning-and-fixing pins mounted on said front end plate and said rear end plate and a plurality of pin-inserting sleeves formed on said front and said rear end of said rotary drum.

5. A casting frame structure of a centrifugal casting machine according to claim 1, wherein said plurality of positioning-and-fixing members is comprised of a plurality of core-positioning-and-fixing pins formed on said front end and said rear end of said rotary drum and a plurality of pin-inserting sleeves mounted on said front end plate and said rear end plate.

6. A casting frame structure of a centrifugal casting machine according to claim 1, wherein said plurality of positioning-and-fixing members is comprised of a plurality of outer-frame-positioning-and-fixing pins mounted on said front end plate and said rear end plate and a plurality of pin-inserting openings formed on said front and said rear end of said rotary drum.

7. A casting frame structure of a centrifugal casting machine according to claim 1, wherein said plurality of positioning-and-fixing members consist is comprised of a plurality of outer-frame-positioning-and-fixing pins formed on said front end and said rear end of said rotary drum and a plurality of pin-inserting openings formed on said front end plate and said rear end plate.

8. A casting frame structure of a centrifugal casting machine according to claim 1, wherein said plurality of positioning-and-fixing members consists is comprised of a plurality of core-positioning-and-fixing pins mounted on said front end plate and said rear end plate and a plurality of pin-inserting openings formed on said front and said rear end of said rotary drum.

9. A casting frame structure of a centrifugal-casting machine according to claim 1, wherein said plurality of positioning-and-fixing members consist is comprised of a plurality of core-positioning-and-fixing pins formed on said front end and said rear end of said rotary drum and a plurality of pin-inserting openings formed on said front end plate and said rear end plate.

* * * * *